United States Patent
Rivas Nass et al.

(10) Patent No.: US 11,623,874 B2
(45) Date of Patent: Apr. 11, 2023

(54) PROCESS FOR THE PRODUCTION OF METAL CARBONYLS

(71) Applicant: Umicore AG & Co. KG, Hanau-Wolfgang (DE)

(72) Inventors: Andreas Rivas Nass, Bensheim (DE); Ruben Ramon Mueller, Nidderau (DE); Angelino Doppiu, Seligenstadt (DE); Eileen Woerner, Nidderau (DE); Ralf Karch, Kleinostheim (DE)

(73) Assignee: Umicore AG & Co. KG, Hanau-Wolfgang (DE)

( * ) Notice: Subject to any disclaimer, the term of this patent is extended or adjusted under 35 U.S.C. 154(b) by 363 days.

(21) Appl. No.: 16/484,195

(22) PCT Filed: Nov. 23, 2017

(86) PCT No.: PCT/EP2017/080179
§ 371 (c)(1),
(2) Date: Aug. 7, 2019

(87) PCT Pub. No.: WO2018/149525
PCT Pub. Date: Aug. 23, 2018

(65) Prior Publication Data
US 2020/0002185 A1    Jan. 2, 2020

(30) Foreign Application Priority Data

Feb. 16, 2017 (DE) .......................... 102017103217.7

(51) Int. Cl.
*C01G 51/02* (2006.01)
(52) U.S. Cl.
CPC .................................... *C01G 51/02* (2013.01)
(58) Field of Classification Search
None
See application file for complete search history.

(56) References Cited

U.S. PATENT DOCUMENTS

| | | | | |
|---|---|---|---|---|
| 2,865,716 A | * | 12/1958 | Hasek | C01G 51/02 |
| | | | | 423/418 |
| 2,865,718 A | | 12/1958 | Fowler | |
| 3,236,597 A | | 2/1966 | Knap | |
| 3,725,534 A | * | 4/1973 | Reisch | C01G 1/04 |
| | | | | 568/451 |
| 3,957,684 A | | 5/1976 | Strohmeyer et al. | |

FOREIGN PATENT DOCUMENTS

| | | |
|---|---|---|
| CN | 1676467 A | 10/2005 |
| CN | 102311341 A | 1/2012 |
| DE | 1071683 B | 12/1959 |
| DE | 2332638 A1 | 1/1975 |
| JP | 47-016397 U | 10/1972 |
| JP | 49-069591 A | 7/1974 |
| JP | 50-037669 A | 4/1975 |
| JP | 50-037699 A | 4/1975 |
| JP | 51-052390 A | 5/1976 |

OTHER PUBLICATIONS

International Search Report for PCT/EP2017/080179 dated Feb. 9, 2018.
Written Opinion of the International Searching Authority for PCT/EP2017/080179 dated Feb. 9, 2018.
Bai, J., et al., "Reduction of threading dislocation densities in AlN/sapphire epilayers driven by growth mode modification", Applied Physics Letters, 2006, vol. 88, pp. 051903-1-051903-3.
Kim, H., et al., "Applications of atomic layer deposition to nanofabrication and emerging nanodevices", Thin Solid Films, 2009, vol. 517, pp. 2563-2580.
Lee, S.W., et al., "Creation and Control of Two-Dimensional Eletron Gas Using Al-Based Amorphous Oxides/SrTiO3 Heterosructures Grown by Atomic Layer Deposition", Nano Letters, 2012, vol. 12, pp. 4775-4783.
Mayer, T., et al., "Atomic-layer deposition of wear-resistant coatings for microelectromechanical devices", Applied Physics Letters, 2003, vol. 82, pp. 2883-2885.

* cited by examiner

*Primary Examiner* — Guinever S Gregorio
(74) *Attorney, Agent, or Firm* — Faegre Drinker Biddley & Reath LLP

(57) ABSTRACT

The invention relates to a process for producing metal carbonyls, wherein a reaction with a reaction mixture containing the following components is conducted in a reactor:
(a) at least one metal carboxylate of formula $(MeR_x)_w$, wherein Me is a transition metal, R is a monocarboxylate having 6 to 12 carbon atoms, x=1, 2, 3, or 4, and w=1, 2, or 3,
(b) carbon monoxide,
(c) an aliphatic alcohol having 4 to 7 carbon atoms—preferably, butanol—and
(d) a solvent,
wherein the average dwell time in the reactor is less than 60 minutes.

13 Claims, No Drawings

PROCESS FOR THE PRODUCTION OF METAL CARBONYLS

CROSS-REFERENCE TO RELATED APPLICATIONS

This application is a national stage application (under 35 U.S.C. § 371) of PCT/EP2017/080179, filed Nov. 23, 2017, which claims benefit of German Application No. 102017103217.7, filed Feb. 16, 2017, both of which are incorporated herein by reference in their entirety.

The invention relates to a process for the continuous production of metal carbonyls in a reaction mixture containing a metal carboxylate, carbon monoxide, an aliphatic alcohol, and a solvent.

PRIOR ART

Metal carbonyls are complex compounds of transition metals, with carbon monoxide as the ligand. The metals are present in the +1-0 oxidation stage here. Metal carbonyls are important intermediate and end products in organic synthesis.

Metal carbonyls are also used as precursors in the deposition of transition metals for the production of coatings. In this case, dicobalt octacarbonyl is a central precursor for the production of atomic layers, which contain cobalt, through ALD (Atomic Layer Deposition; Thin Solid Films 517 (2009) 2563-2580; Appl. Phys. Lett. 88 (2006) 051903-051907; Appl. Phys. Lett. 88 (2003) 2883-2885; Nano Lett. 12 (2012) 4775-4783). ALD is a coating technology, in which chemicals are thermally or chemically treated in ultrapure reactors (ALD chambers). The goal of this treatment is the deposition of certain elements or compositions on a surface (carrier surface—generally known as a wafer). The process is carried out repeatedly in cycles, which leads to the formation of a layer. This type of highly selective, ultrapure, and highly structured layer formation (contrary to plasma deposition PVD or classic CVD) is required for forming materials based upon layers, which are used, for example, in electronic components (logic or memory chips), LED's, or photovoltaic (PV) cells.

Precursors, in particular, are necessary for ALD. In the area of cobalt precursors, dicobalt octacarbonyl is the decisive starting substance for producing the most varied of cobalt precursors for the final application in the ALD deposition processes.

Due to the high practical significance of metal carbonyls, there is an increasing need for improved processes for the production thereof. In doing so, it is desirable to produce metal carbonyls using simple and efficient processes with the highest yield and purity possible. Because such metal complexes are unstable and tend to decompose, and are thus not easy to handle, the production is generally no small matter. The process is generally made difficult due to the fact that it takes place in a multiphase system, wherein gaseous (and, additionally, highly toxic) carbon monoxide is added and wherein the metal carbonyl is a solid.

In order to produce metal carbonyls, typically, conventional batch reactions are used in the prior art. In doing so, the starting substances are added to an autoclave, in which the reaction is carried out at high pressure and at high temperature. However, such batch reactions are unsuitable or not well-suited for industrial-scale manufacture of metal carbonyls. On the one hand, pressure and temperature are not, or are only with difficulty, controllable and adjustable in autoclaves—particularly when large quantities are used. On the other hand, it is basically disadvantageous that batch reactions, due to the necessary setup time for filling and cleaning the vessels and the separation of the product, are labor-intensive.

It would therefore be desirable to provide a continuous method for producing metal carbonyls. However, the continuous implementation of such processes is complex, because they are carried out at high pressure and high temperature, require gaseous carbon monoxide, and lead to unstable metal carbonyls, among other things. Such reactions often require special, complex devices and test setups, wherein, even then, the desired product is often not obtained in high yields.

Thus, the known processes for producing $Co_2(CO)_8$ are only with great effort scalable at the production scale (high pressures up to about 500 bar, temperatures up to 300° C., large batch reactors) and/or do not provide the product in sufficient purity. Specific problems here are, among others, impurities in the product with reduction metals such as Zn, or that the product is obtained as a mixture with other cobalt compounds. It is also problematic that the product, in known processes, is not obtained as a solid, but rather as a solution in organic solvents that are not miscible with water. The yields, also, normally require improvement.

U.S. Pat. No. 2,865,716 describes processes for producing dicobalt octacarbonyl by converting cobalt salts of organic acids with carbon monoxide. The reaction is implemented as a conventional batch reaction in an autoclave at high temperature and high pressure. The reaction takes place on a laboratory scale, wherein the quantities of the starting substances and products are in the gram range. With the various reactions, described in detail, yields of between about 30% and 78% are obtained, which still requires improvement on a batch scale.

What is particularly problematic is that the batch process in U.S. Pat. No. 2,865,716 requires relatively long reaction times in the range of several hours. Batch processes, which already require reaction times of several hours in an autoclave, cannot generally be carried out as efficiently and with yields as good as with continuous processes. If a reaction proceeds too slowly, with a continuous process, the adding of the educts and the removal of the products may not take place with the necessary speed.

DE 23 32 638 A1 describes a continuous process for producing dicobalt octacarbonyl. According to the exemplary embodiment, aqueous cobalt acetate solution is converted at increased temperature and increased pressure in the presence of butanol, carbon monoxide, and hydrogen.

The process is very inefficient, because the cobalt acetate is used in a highly diluted, aqueous solution (1% $Co^{2+}$). Therefore, the process is described only on a laboratory scale, with quantities in the milliliter range. Scaling up to a production scale would be demanding and inefficient, because large devices would be required due to the strong dilution. A further disadvantage is that the reaction is carried out in the presence of hydrogen. This is undesirable, because molecular hydrogen is explosive, difficult to handle, and expensive. Another disadvantage is that the product is present in diluted aqueous solution, which is disadvantageous for many downstream applications. Moreover, no information is given about yield or purity of the product. Overall, the process is not suitable for producing dicobalt octacarbonyl efficiently on a production scale.

Thus, there is need for a process that will overcome the aforementioned disadvantages. In particular, there is need for a process for producing metal carbonyls, such as dicobalt octacarbonyl, at high yield and with high purity, which can be implemented on a production scale. Particularly desirable would be a continuous process, which can be implemented, controlled, and scaled in a simple manner.

Aim of the Invention

The invention is based upon the aim of providing processes that overcome the above-described disadvantages. In particular, efficient, improved processes for producing metal carbonyls shall be provided. A particular aim upon which the invention is based is to provide improved processes for producing dicobalt octacarbonyl.

The processes are to enable the production of metal carbonyls on an industrial scale, in large yields, and with high purity. It should be possible to implement the processes as simply and efficiently as possible. In doing so, as few starting substances and additives as possible are to be required. In particular, the adding of compounds that would contaminate the product, such as metals and metal compounds, or of highly reactive compounds, such as hydrogen, are to be avoided.

Short Description of the Invention

The invention is, in particular, characterized by embodiments 1 through 25 as follows:
1. Process for producing metal carbonyls, wherein a reaction with a reaction mixture containing the following components is conducted in a reactor:
   (a) at least one metal carboxylate of formula $(MeR_x)_w$, wherein Me is a transition metal, R is a monocarboxylate having 6 to 12 carbon atoms, x=1, 2, 3, or 4, and w=1, 2, or 3,
   (b) carbon monoxide,
   (c) an aliphatic alcohol having 4 to 7 carbon atoms—preferably, butanol—and
   (d) a solvent,
wherein the average dwell time in the reactor is less than 60 minutes.
2. Process according to embodiment 1, wherein the reaction is carried out continuously, 3. Process according to at least one of the preceding embodiments, wherein the metal carbonyl has the formula $Me_3(CO)_{12}$, $Me_2(CO)_8$, $Me(CO)_4$, $Me(CO)_5$, or $Me(CO)_5$.
4. Process according to at least one of the preceding embodiments, wherein the metal Me is a transition metal, which is selected from Co, W, Mo, Ru, Ni, and Mn.
5. Process according to embodiment 4, wherein the metal carbonyl is selected from $Co_2(CO)_8$, $W(CO)_6$, $Mo(CO)_6$, $Ru_3(CO)_{12}$, $Ni(CO)_4$, and $Mn_2(CO)_{10}$.
6. Process according to embodiment 5, wherein the metal carbonyl is dicobalt octacarbonyl $(Co_2(CO)_8)$.
7. Process according to embodiment 6, wherein the metal carboxylate has the formula $CoR_2$.
8. Process according to embodiment 6 or 7, wherein the metal carboxylate is cobalt(II)bis(2-ethyl hexanoate).
9. Process according to at least one of the preceding embodiments, wherein the alcohol is a monovalent alcohol.
10. Process according to embodiment 9, wherein the alcohol is selected from butanol, pentanol, hexanol, and heptanol.
11. Process according to embodiment 10, wherein the alcohol is n-butanol.
12. Process according to at least one of embodiments 1 through 8, wherein the alcohol is a polyol.
13. Process according to at least one of the preceding embodiments, wherein the solvent has hydrocarbons or consists thereof.
14. Process according to embodiment 13, wherein the solvent is a hydrocarbon mixture comprising aliphates, which may have a small portion of aromatic compounds, which is less than 5 wt %, for example.
15. Process according to at least one of the preceding embodiments, wherein the reaction is carried out at a temperature ranging from 100° C. to 300° C., or particularly from 180° C. to 220° C.
16. Process according to at least one of the preceding embodiments, wherein the reaction is carried out at a pressure ranging from 50 bar to 500 bar, or particularly from 180 bar to 210 bar.
17. Process according to at least one of the preceding embodiments, wherein the molar ratio of carbon monoxide to metal carboxylate used is greater than 3:1.
18. Process according to at least one of the preceding embodiments, wherein the average dwell time is between 5 minutes and 30 minutes.
19. Process according to at least one of the preceding embodiments, wherein the reaction mixture does not contain one or more of the following components:
   hydrogen,
   an additional reaction agent,
   a metal,
   an additional metallic salt—particularly, the salt of a subgroup metal—
   additional dicobalt octacarbonyl.
20. Process according to at least one of the preceding embodiments, wherein the metal carbonyl precipitates out as a solid and is removed.
21. Process according to at least one of the preceding embodiments, wherein the reaction mixture is cooled down to a temperature of less than 10° C. or less than −10° C. after the conversion.
22. Process according to at least one of the preceding embodiments, wherein the metal carbonyl is washed with at least one hydrocarbon, and a product is obtained having 0.5 to 8 wt % of the hydrocarbon, in relation to the metal carbonyl.
23. Process according to at least one of the preceding embodiments, wherein the yield is at least 70%—preferably, at least 80%—in relation to the quantity of the metal used.
24. Process according to at least one of the preceding embodiments, wherein the space-time yield is greater than 6,000 $kg/m^3d$.
25. Process according to at least one of the preceding embodiments for producing dicobalt octacarbonyl, wherein the reaction mixture contains the following components:
   (a) cobalt(II)bis(2-ethyl hexanoate),
   (b) carbon monoxide,
   (c) butanol, and
   (d) a solvent containing hydrocarbons,
wherein the reaction mixture does not contain any hydrogen, wherein the reaction is carried out at a temperature ranging from 100° C. to 300° C. and at a pressure ranging from 50 bar to 500 bar.

Disclosure of the Invention

Surprisingly, the aim upon which the invention is based is achieved by a process according to the claims.

The subject matter of the invention is a process for producing metal carbonyls, wherein a reaction with a reaction mixture containing the following components is conducted in a reactor:

(a) at least one metal carboxylate of formula $(MeR_x)_w$, wherein Me is a transition metal, R is a monocarboxylate having 6 to 12 carbon atoms, x=1, 2, 3, or 4, and w=1, 2, or 3,
(b) carbon monoxide,
(c) an aliphatic alcohol having 4 to 7 carbon atoms—preferably, butanol—and
(d) a solvent, wherein the average dwell time in the reactor is less than 60 minutes.

In this process, components (a) through (c) react to the metal carbonyl. The process preferably comprises only a single reaction step, which occurs in the reaction mixture. The reaction is essentially a redox reaction, in which, among other things, the metal is reduced, in conjunction with the esterification of butanol.

According to the invention, it has been found that the reaction of components (a) through (c) proceeds unexpectedly quickly. The reaction is thus characterized by a relatively short dwell time, wherein the average dwell time is less than 60 minutes. In a process, the average dwell time is the time in which, for example, a defined volume of liquid "dwells" in a reactor. The dwell time also indicates how long a dissolved compound, whose concentration is not reduced by the reaction, dwells in the reactor. The dwell time is characterized by the Greek letter T (tau) and, in particular, describes the efficiency of the process with continuous reactions. For a continuous reaction, the average dwell time can be calculated from the ratio of the reactor volume to the exiting volumetric flow. The dwell time can also be determined empirically by measuring the duration of the flow in an inert tracer compound. In a batch reactor, the dwell time is equal to the reaction time.

According to the invention, a high yield can then be achieved even when the dwell time is relatively low. In doing so, it may be sufficient when the average dwell time is no more than 40 minutes, no more than 30 minutes, less than 20 minutes, or less than 15 minutes. The dwell time is thus preferably greater than one minute, greater than 2 minutes, or greater than 5 minutes. In a preferred embodiment, the average dwell time is from 2 minutes to 60 minutes, or particularly from 5 minutes to 30 minutes, or from 5 minutes to 20 minutes.

The reaction may be carried out continuously, semi-continuously, or as a batch reaction. The reaction is preferably carried out continuously. As is customary in chemical engineering, a continuous process is characterized as one that can be conducted continuously and without interruptions. In this process, starting substances can be added and products can be removed while the reaction is taking place. The continuous reaction contrasts with a batch process, in which the starting substances are placed before the start of the reaction, and the product is not removed until after the end of the reaction. Customarily, continuous processes take place in reactors, which the reaction mixture flows through, while batch processes are carried out in closed vessels.

The product is a metal carbonyl, i.e., a compound of formula $Me_y(CO)_z$. In this case, y is preferably an integer between 1 and 3, and z is preferably an integer between 4 and 12. The metal carbonyl may have, for example, the formula $Me_3(CO)_{12}$, $Me_2(CO)_8$, $Me(CO)_4$, $Me(CO)_5$, or $Me(CO)_6$. It may be selected, for example, from $Co_2(CO)_8$, $W(CO)_6$, $Mo(CO)_6$, $Ru_3(CO)_{12}$, $Ni(CO)_4$, or $Mn_2(CO)_{10}$.

The reaction mixture contains (a) at least one metal carboxylate of formula $(MeR_x)_w$. The metal here is a transition metal that is preferably selected from Co, W, Mo, Ru, Ni, and Mn. The metal is especially preferably Co. The metal is present in the metal carboxylate preferably in the reaction stage 2, 3, or 4—in particular, 2. In formula $(MeR_x)_w$, the value x corresponds to the oxidation stage of the metal. In order to simplify the reaction, it is preferable that only a single metal carboxylate be contained in the reaction mixture. The value w is between 1 and 3. This means that the compound of formula $(MeR_x)$ may be present as a monomer, dimer, or trimer.

The metal carboxylate is a monocarboxylate, i.e., the carboxylate of a monocarboxylic acid having 6 to 12 carbon atoms. The monocarboxylic acid preferably has 8 carbon atoms. The carboxylic acid is preferably branched or linear—especially, branched.

The general reaction equation of the reaction with the butanol and carbon monoxide is represented as follows:

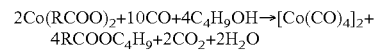

In a preferred embodiment, the metal carboxylate is cobalt(II)bis(2-ethyl hexanoate) (also characterized as cobalt(II)ethyl hexanoate), which has formula (I):

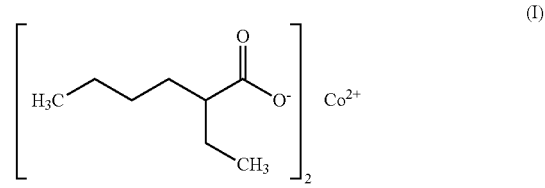

The metal carbonyl dicobalt octacarbonyl of formula $Co_2(CO)_8$ and the metal carboxylate cobalt(II)bis(2-ethyl hexanoate) are especially preferred.

The metal carboxylate is preferably added to the reactor in an already dissolved form. The metal carboxylate is especially preferably used in the form of a solution in a hydrocarbon mixture. Such solutions of metal carboxylates in hydrocarbon mixtures are available commercially. For example, a solution of 70% cobalt-2-ethyl hexanoate in a 25% hydrocarbon mixture is distributed by Umicore under the brand name VALIREX, wherein various cobalt concentrations can be obtained.

The reaction mixture contains carbon monoxide (CO) as component (b). An efficient, thorough mixing of the liquid phase with the gas phase can be achieved through increased pressure. The carbon monoxide is added to the reactor in suitable form—for example, as a gas. In a preferred embodiment, the carbon monoxide is added in compressed-liquefied form or as a supercritical fluid, and/or is present in this form during the reaction.

The reaction mixture contains an aliphatic alcohol having 4 to 7 carbon atoms as component (c). Aliphatic alcohols consist of the elements C, O, and H. The alcohol forms an alkyl ester—generally, with the carboxylate—during the reaction. The alcohol is preferably a monovalent alcohol; however, it can also be polyvalent—for example, bivalent or trivalent. The alcohol can be linear, branched, or cyclic. The alcohol is advantageously selected from butanol, pentanol, hexanol, and heptanol. The alcohol is preferably a linear alcohol and/or a 1-alcohol. The alcohol is especially preferably butanol. n-Butanol (1-butanol) is used with particular preference.

The reaction mixture contains a solvent as component (d). Suitable solvents are compounds or mixtures that dissolve the metal carboxylate (a) and are miscible with the alcohol (c) in liquid form, and that are inert in the reaction. The reaction mixture is preferably a solution and is present in liquid form, wherein the carbon monoxide can form an at least partially distributed gas phase in the liquid. Preferably, in the process, the metal carboxylate is provided as a solution in the solvent (d) and added to the reaction mixture.

In a preferred embodiment, the solvent has hydrocarbons or consists thereof. The hydrocarbons can be aliphatic, aromatic, or mixtures thereof. Hydrocarbon mixtures are preferably used. Particularly suitable are mixtures comprising aliphates—for example, isocyclic and cyclic aliphates. They may have a small portion of aromatic compounds, which is, for example, less than 5 wt % or less than 2 wt %. Non-cyclic hydrocarbons, which may, for example, be branched or linear, are likewise suitable. Polyols, such as, for example, glycol ethers, may also be present in small quantities such as, for example, of up to 2%, and do not impact the reaction.

In a preferred embodiment, the reaction mixture consists of components (a) through (d). According to the invention, it has been found that an efficient reaction is only possible when components (a) through (d) are contained. Further reactants or additives are not required. Thus, the continuous process can be adjusted, executed, and controlled in a relatively simple manner.

It is advantageous that the reaction can be efficiently carried out with just a few starting compounds, (a) through (d). Thus, no further components need to be added which negatively impact the reaction itself or the product. In preferred embodiments, the reaction mixture does not contain one or more of the following components:

hydrogen, an additional reaction agent,
a metal,
an additional metallic salt—particularly, the salt of a subgroup metal—
additional dicobalt octacarbonyl.

For example, it is not necessary to add reactive compounds such as hydrogen that are very difficult to handle. With processes from the prior art for producing metal carbonyls, often, a mixture comprising carbon monoxide and hydrogen is added. Due to the high level of reactivity of hydrogen, the process is more complicated, demanding, and expensive. The reaction agent can also be a reduction agent, because additional reduction agents such as organic compounds, which are used as reduction agents, or even metals such as, for example, Zn, Hg, Al, and Mg, are not necessary and thus, advantageously, are not included. It is also not necessary to use additional metals or metal compounds that could contaminate the product. In particular, if the metal carbonyl is used in coating processes such as ALD for the production of electronic components, even slight contaminations from other metals are not acceptable.

In a preferred embodiment, the reaction is carried out at a temperature ranging from 30° C. to 300° C. The temperature is preferably greater than 150° C. or greater than 180° C., and preferably less than 300° C. and less than 250° C. The temperature is preferably in a range of 100° C. to 300° C., or particularly of 150° C. to 250° C. In particular, the production of dicobalt octacarbonyl is especially efficient in a range of 180° C. to 220° C., or particularly of 190° C. to 210° C., or of 180° C. to 200° C. Such temperatures, and particularly a temperature of about 200° C., are particularly suitable for producing dicobalt octacarbonyl.

In a preferred embodiment, the reaction is carried out at a pressure in a range of 50 bar to 500 bar. Especially suitable is a pressure greater than 100 bar or greater than 150 bar, and, particularly, less than 300 bar or less than 250 bar. The pressure is preferably from 150 to 250 bar. In particular, the production of dicobalt octacarbonyl is especially efficient in a range of 180 bar to 210 bar or 190 bar to about 210 bar, or, particularly, about 200 bar.

The carbon monoxide is preferably used in a molar excess as compared to the metal (metal carboxylate). In doing so, the molar ratio is preferably greater than 2:1 or greater than 3:1. In a preferred embodiment, the molar ratio of carbon monoxide to metal carboxylate is greater than 5:1. The carbon monoxide can also be used in significant excess, e.g., greater than 10:1, greater than 50:1, or greater than 200:1. According to the invention, it has been found, however, that even a relatively small excess of 7.5:1, for example, is sufficient for executing a quick reaction with high yield. Thus, it is advantageous for reasons of efficiency and material savings to keep the excess of carbon monoxide as low as possible. Thus, a molar ratio of carbon monoxide to metal carboxylate of less than 50:1, or less than 20:1, or less than 10:1 is preferred. In particular, the molar ratio of carbon monoxide to metal carboxylate ranges from 3:1 to 20:1.

According to the invention, it has been found that, when implementing a continuous process, very high yields of more than 80% can be achieved, even with very low dwell times ranging from about 6 to 12 minutes. This was unexpected, because it was known in the prior art that comparable batch reactions require a reaction time of several hours (U.S. Pat. No. 2,865,718). Such slow reactions are generally not suitable for continuous execution. The reason for this is that the reaction flow would have to be adjusted very slowly in the reactor. This could result in precipitation in the interior of the reactor that would impact the course of the reaction. Thus, it was unexpected, starting from the prior art, that a batch process according to U.S. Pat. No. 2,865,718 would be continuously executable—not to mention with short reaction times and while achieving high yields.

The quantity of alcohol (c)—particularly, butanol—is selected such that an optimal reaction takes place. The molar ratio of cobalt to butanol is preferably between 1:1 and 1:6.

The reaction according to the invention can essentially take place in the absence of water. This can result in a metal carbonyl that is completely or essentially anhydrous. This is advantageous, because anhydrous metal carbonyls are required for many downstream applications, such as AVD. The water content of the reaction mixture is preferably 0 wt % to 2 wt %, or particularly 0.1 to 1.6 wt %, or 0.2 to 1.1 wt %. The water content of the end product is preferably less than 0.5 wt %, or preferably less than 0.2 wt %.

In a preferred embodiment, the metal carbonyl precipitates out and is removed as a solid. After the conversion, the reaction mixture is preferably relaxed and cooled, and the reaction mixture precipitates. The reaction product is preferably collected after it has proceeded through the reaction zone in the reactor. In doing so, a liquid phase that contains the reaction product is preferably collected. A fraction with the reaction product is preferably separated off in a phase separator. The precipitation of the metal carbonyl as a solid takes place preferably through cooling. In this process, the reaction mixture can be cooled down to, for example, room temperature, or to a temperature less than 10° C. or less than −10° C. The reaction mixture is preferably cooled down to −18° C. In order to achieve complete precipitation, the reaction mixture here can be incubated for a longer period of time—for example, for 30 minutes to 10 hours. The metal carbonyl is washed—preferably, with a hydrocarbon such as, for example, hexane or iso-hexane. After washing, the metal carbonyl preferably still has a small portion of the hydrocarbon—preferably, about 0.5-8 wt %. Such a type of product exhibits increased storage stability.

The reaction can be carried out in a customary reactor for continuous reactions. In doing so, a simple tubular reactor is especially suitable, in which the starting substances are introduced on one side, and wherein the product is collected at the outlet of the reactor. The advantage of such simple tubular reactors is that the reaction can, as a whole, be relatively simply controlled. Scaling up is possible in a relatively simple manner, because temperature and pressure can be adjusted constantly in a tubular reactor. In a preferred embodiment, the reactor has a mixer to ensure continuous, thorough mixing of the reaction mixture. A static mixer is preferably used, in order to generate a turbulent flow.

Metal carbonyls can be obtained in high yields with the process according to the invention. In a preferred embodiment, the yield is at least 70% or at least 80%, in relation to the quantity of the metal used.

The product is preferably obtained in a space-time yield (STY) of greater than 5,000—preferably, greater than 6,000, or, even more preferably, greater than 7,000-kg/m$^3$d. Thus, the continuous reaction can be carried out with great efficiency and high yield.

The process according to the invention is especially suitable for producing dicobalt octacarbonyl in a continuous process. In a preferred embodiment, the reaction mixture contains the following components:
  (a) cobalt(II)bis(2-ethyl hexanoate),
  (b) carbon monoxide,
  (c) butanol, and
  (d) a solvent containing hydrocarbons,
wherein the reaction mixture does not contain any hydrogen, wherein the reaction is carried out at a temperature ranging from 100° C. to 300° C. and at a pressure ranging from 50 bar to 500 bar. The molar ratio of carbon monoxide to cobalt here is preferably greater than 3:1, wherein the average dwell time is preferably from 2 to 30 minutes, and wherein the yield is preferably at least 70%, in relation to the quantity of the metal used.

The production of dicobalt octacarbonyl takes place here preferably through conversion of a cobalt carboxylate with carbon monoxide in butanol at pressures of up to 200 bar and temperatures of 200° C. The reactants in this case are in the homogeneous phase and react to the product within minutes. After relaxing the reaction mixture to normal pressure and cooling down to −18° C., the dicobalt octacarbonyl precipitates out as orange-colored needles. The simple and quick reaction control enables a continuous reaction control, which was successfully tested on a pilot scale (tubular reactor: 12 mm diameter, about 1 m long, throughput times of about 12 minutes).

The targeted improvement and simplification of multiple syntheses known in the literature, and the observation that the use of strong carbon-containing cobalt precursors would lead to high yields, enabled a continuous process to be found that leads to pure $Co_2(CO)_8$ in high yields without additional extensive treatment. Because no additional reduction agents such as hydrogen or reduction metals are used, the process is, additionally, safer and leads to a product of higher purity.

Preferably, cobalt precursors are used having a high carbon portion in the molecule, such as cobalt ethyl hexanoate. Only CO and butanol are used as the further reactants, while hydrogen or reduction agents such as Zn are not required.

The product precipitates in pure form. No essential impurities from other cobalt compounds, such as cobalt hydrides, are formed or found. The product is not present in dissolved form, but rather precipitates out after the reaction and reduction of the temperature to about −18° C. The reaction time is very brief (a few minutes).

It is advantageous that the reaction mixture contains no water. Particularly in the presence of large quantities of water, such as, for example, with the process described in DE 23 32 638 A1, the yield is reduced, and the hydrocarbon used results in hydrido cobalt tetracarbonyl as a by-product.

The process is significantly more efficient and safer, and achieves higher purity levels, compared to the known syntheses for $Co_2(CO)_8$. The process can be realized in simple, customary production equipment. Due to the simplicity of the process and the equipment, and the few starting substances, the process can be scaled upwards in a simple manner. Thus, the process itself could be carried out efficiently and in a competitive manner if the yields were low and, for example, at 20%. According to the invention, however, very high yields of up to 81% and more can be achieved.

The invention provides an efficient, safe process that enables the production of a clean product. The equipment can be operated continuously, which enables an effective and controlled production of the product. No additional gases such as hydrogen or other reagents are necessary. Molar quantities of reduction agents (Zn or others) can be dispensed with. The metal carbonyls are suitable for electronic applications and ALD (Atomic Layer Deposition) processes, due to the high purity level. They are also suitable, for example, as catalysts or catalyst precursors, or for the production of ultrapure products such as those for pharmaceutical applications, fine-chemical products, or for applications in downstream chemistry.

EXEMPLARY EMBODIMENTS

A: Implementation

In various continuous processes, dicobalt octacarbonyl was produced from cobalt-2-ethyl hexanoate, carbon monoxide, and butanol.

A solution of 70% cobalt-2-ethyl hexanoate in a 25% hydrocarbon mixture (mixture comprising isocyclic and cyclic aliphates with less than 2 wt % aromatic compounds and glycol ether as the stabilizer; VALIREX® Co 12% D60 UPR; Umicore) was diluted with n-butanol and pumped into a tubular reactor at a flow rate of 5 mL/min. The same flow rate was adjusted for carbon monoxide (CO), which was added in a significant excess in relation to cobalt. Assuming carbon monoxide (CO) as the ideal gas, the molar ratio of carbon monoxide (CO) to cobalt was 420:1. The reaction was carried out at a temperature of 200° C. and a pressure of 200 bar. The dwell time of the reaction mixture in the reactor was about 12.5 minutes. The conditions of the continuous process were varied (Examples 4 through 17). The respective test conditions and results are compiled in Table 1.

The tubular reactor had a length of 1,100 mm, and a diameter of 12 mm with a volume of 122 mm (Examples 4 through 13), and a diameter of 18 mm with a volume of 279 mL (Examples 14 through 17), respectively. At the end of the reactor, a cooling chamber was connected, in which the reaction mixture was collected in a phase separator at about 50° C. The liquid phase, which was collected over a time of 70 minutes, was cooled down in a freezer until the product crystallized. The product was filtrated off and washed with cold diethyl ether.

Table 1 shows the molar ratios of the solution of cobalt-2-ethyl hexanoate in the hydrocarbon mixture (VALIREX®)

to butanol, as well as of carbon monoxide (CO) to cobalt (Co). The "Mixer" column states whether a static mixer was used in the test setup in order to ensure the desired turbulent flow. The "STY" column indicates the space-time yield. The "Age" column states how long the VALIREX® solution was stored beforehand.

For comparison, three discontinuous processes (batch processes) were carried out (Comparison examples 1 through 3). In Table 1, the information, "Batch" and "Cont.", indicates a batch process or continuous process. For tests that were not carried out continuously, the volume of the reactor used in each case is indicated.

B: Results

The results show that the process according to the invention can be carried out with a very short reaction time, wherein high yields can still be obtained. The average dwell times in the continuous reactor can be adjusted here in ranges of only about 6 to 24 minutes. In doing so, a yield of 81% dicobalt octacarbonyl was obtained according to Example 17. This corresponded to the yield with a batch reaction under comparable conditions. With the continuous process, however, the space-time yield was drastically increased to up to 8,457 g·(m³·d)$^{-1}$. With Examples 5 through 7, smaller yields were obtained, which may have been due to the longer storage time of the cobalt-2-ethyl hexanoate. The results show, on the whole, that the reaction according to the invention proceeds very quickly and with high yields, wherein the continuous process can be carried out significantly more efficiently than a comparable batch process can.

minutes, and wherein the reaction mixture does not contain one or more of the following further components:
hydrogen,
an additional reaction agent,
a metal,
an additional metallic salt,
additional dicobalt octacarbonyl.

2. The process according to claim 1, wherein the metal carbonyl is dicobalt octacarbonyl $Co_2(CO)_8$.

3. The process according to claim 2, wherein the metal carboxylate has the formula $CoR_2$.

4. The process according to claim 3, wherein the metal carboxylate is cobalt(II)bis(2-ethyl hexanoate).

5. The process according to claim 1, wherein the alcohol is n-butanol.

6. The process according to claim 1, wherein the solvent has hydrocarbons or consists thereof.

7. The process according to claim 1, wherein the reaction is carried out at a temperature ranging from 100° C. to 300° C. and/or
wherein the reaction is carried out at a pressure ranging from 50 bar to 500 bar.

8. The process according to claim 1, wherein the molar ratio of carbon monoxide to metal carboxylate used is greater than 3:1.

9. The process according to claim 1, wherein the average dwell time is between 5 minutes and 20 minutes.

10. The process according to claim 1, wherein the metal carbonyl precipitates out as a solid and is removed, and/or

TABLE 1

Summary of the reaction conditions and results from Examples 1 through 17

| Example | Type | Age | Mixer | $n_{Valirex}/n_{BuOH}$ | $n_{CO}/n_{co}$ | Avg. dwell time [min] | Reaction time [min] | Yield$^a$ | STY [kg/m³ · d] | V (Reactor) [mL] |
|---|---|---|---|---|---|---|---|---|---|---|
| 1 (comparison) | Batch | | | | | 40 | 40 | 84% | 2505 | 250 |
| 2 (comparison) | Batch | | | | | 40 | 40 | 89% | 2238 | 1300 |
| 3 (comparison) | Batch | | | | | 30 | 30 | 89% | 2175 | 250 |
| 4 | Cont. | 9 mo. | No | 1/1 | 420/1 | 12.5 | 70 | 81% | 8457 | |
| 5 | Cont. | 9 mo. | No | 2.7/1 | 7.5/1 | 12.5 | 30 | 16% | 1882 | |
| 6 | Cont. | 9 mo. | No | 2.7/1 | 5.5/1 | 12.5 | 40 | 23% | 3302 | |
| 7 | Cont. | 9 mo. | No | 1/1 | 7.5/1 | 12.5 | 30 | 35% | 3686 | |
| 8 | Cont. | Fresh | No | 1/1 | 7.5/1 | 12.5 | 30 | 62% | 6451 | |
| 9 | Cont. | Fresh | No | 1/1 | 7.5/1 | 12.5 | 80 | 69% | 7200 | |
| 10 | Cont. | Fresh | No | 2.7/1 | 7.5/1 | 12.5 | 80 | 43% | 5155 | |
| 11 | Cont. | Fresh | No | 1/1 | 7.5/1 | 6.25 | 41 | 22% | 4496 | |
| 12 | Cont. | Fresh | No | 1/1 | 15/1 | 7.5 | 80 | 63% | 6610 | |
| 13 | Cont. | Fresh | No | 1/1 | 15/1 | 25 | 80 | 68% | 3528 | |
| 14 | Cont. | Fresh | Yes | 1/1 | 7.5/1 | 12 | 60 | 55% | 6171 | |
| 15 | Cont. | Fresh | Yes | 1/1 | 7.5/1 | 12 | 60 | 66% | 7371 | |
| 16 | K | Fresh | Yes | 1/1 | 7.5/1 | 12 | 60 | 44% | 4911 | |
| 17 | K | Fresh | Yes | 1/1 | 7.5/1 | 24 | 75 | 81% | 4512 | |

The invention claimed is:

1. A process for producing metal carbonyls, comprising reacting a reaction mixture containing the following components in a reactor:
(a) at least one metal carboxylate of formula $(MeR_x)_w$, wherein Me is a transition metal, R is a monocarboxylate having 6 to 12 carbon atoms, x=1, 2, 3, or 4, and w=1, 2, or 3,
(b) carbon monoxide,
(c) an aliphatic alcohol having 4 to 7 carbon atoms, and
(d) a solvent,
wherein the reaction is carried out continuously and the average dwell time in the reactor is from 2 to 20 wherein the metal carbonyl is washed with at least one hydrocarbon, and a product is obtained having 0.5 to 8 wt % of the hydrocarbon, in relation to the metal carbonyl.

11. The process according to claim 1, wherein the yield is at least 80% in relation to the quantity of the metal used.

12. The process according to claim 1, wherein the space-time yield is greater than 6,000 kg/m³d.

13. The process according to claim 1 for producing dicobalt octacarbonyl, wherein the reaction mixture contains the following components:
(a) cobalt(II)bis(2-ethyl hexanoate),
(b) carbon monoxide,
(c) butanol, and (d) a solvent containing hydrocarbons,
wherein the reaction mixture does not contain any hydrogen,
wherein the reaction is carried out at a temperature ranging from 100° C. to 300° C. and at a pressure ranging from 50 bar to 500 bar.

\* \* \* \* \*